United States Patent
Busch et al.

[11] Patent Number: 5,112,085
[45] Date of Patent: May 12, 1992

[54] TUBE COUPLING WITH COMBINATION RETAINER AND DISASSEMBLY TOOL

[75] Inventors: John Busch, Grosse Ile; William E. Potter, Canton, both of Mich.

[73] Assignee: Ford Motor Company, Dearborn, Mich.

[21] Appl. No.: 614,525

[22] Filed: Nov. 16, 1990

[51] Int. Cl.[5] .............................................. F10L 35/00
[52] U.S. Cl. ..................................... 285/39; 285/308; 285/319; 285/305; 285/318
[58] Field of Search ................. 285/39, 308, 309, 313, 285/318, 319, 320, 305

[56] References Cited

U.S. PATENT DOCUMENTS

| | | |
|---|---|---|
| 474,393 | 11/1887 | Jacobson et al. |
| 922,805 | 5/1909 | Nelson et al. ................... 285/319 X |
| 1,209,374 | 12/1916 | Andreolli ......................... 285/320 X |
| 1,476,810 | 12/1923 | Gilsenan . |
| 1,816,301 | 7/1931 | Sundell . |
| 1,966,718 | 7/1934 | Hanson . |
| 2,004,967 | 6/1935 | Williams . |
| 2,499,476 | 3/1950 | Eyerly ............................. 285/320 X |
| 2,885,755 | 5/1959 | Johnson . |
| 3,403,930 | 10/1968 | Bernier . |
| 3,521,332 | 7/1970 | Kramer . |
| 4,055,359 | 10/1977 | McWethy . |
| 4,401,326 | 8/1983 | Blair .................................... 285/318 |
| 4,487,437 | 12/1984 | Dickirson . |
| 4,632,434 | 12/1986 | Proctor et al. ................. 285/305 X |
| 4,728,130 | 3/1988 | Corzine ........................... 285/318 X |
| 4,750,762 | 6/1988 | Corzine ........................... 285/318 X |
| 4,793,637 | 12/1988 | Laipply et al. ....................... 285/39 |

FOREIGN PATENT DOCUMENTS

| | | | |
|---|---|---|---|
| 0571613 | 3/1962 | Belgium ............................. 285/320 |
| 0683011 | 3/1964 | Canada ............................... 285/318 |
| 0017133 | of 1909 | United Kingdom ................ 285/318 |

OTHER PUBLICATIONS

Ford Motor Co. 1990 Tempo/Today, Escort Car Shop Manual pp. 24-50-15 and 16.

Primary Examiner—Dave W. Arola
Assistant Examiner—Heather Chun
Attorney, Agent, or Firm—Jerome R. Drouillard; Clifford L. Sadler

[57] ABSTRACT

A tube coupling and combination retainer and disassembly tool includes a first tube having a first end portion for telescopically receiving a second tube therein and a second tube having a second end portion including a structure for telescopically engaging the first end portion and a first fastening device for securing the first and second end portions to each other. A tube coupling and retainer according to the present invention further includes a second fastening structure for selectively securing the first and second end portions to each other and for disengaging the first fastening structure upon demand.

13 Claims, 2 Drawing Sheets

TUBE COUPLING WITH COMBINATION RETAINER AND DISASSEMBLY TOOL

BACKGROUND OF THE INVENTION

1. Field of the Invention

This invention relates to a coupling for joining two tube ends, as well as to a combination redundant retainer and disassembly tool for separating the coupling.

2. Disclosure Information

Hose or pipe couplings using unthreaded joining techniques to give quick disconnect capability have been in use for many years. A frequently employed system for achieving retention of the coupled tube ends is illustrated in U.S. Pat. No. 1,966,718 to Hanson, U.S. Pat. No. 2,004,967 to Williams and, in the case of an electrical connector, in U.S. Pat. No. 3,403,930 to Bernier. Each of these illustrated systems relies on cam operated mechanism to control a latching system which physically engages the tube ends to be joined.

Other types of hose couplings require the use of a separate tool for releasing a coupling retention mechanism. Examples of couplings requiring a separate tool are shown in U.S. Pat. No. 373,292 to Jacobson et al., U.S. Pat. No. 4,055,359 to McWethy and U.S. Pat. No. 4,487,437 to Dickinson. The requirement of a special tool to separate the coupling is generally undesirable from the standpoint of cost and product line complexity.

All of the foregoing hose couplings suffer from a common drawback inasmuch as none of the couplings has a redundant retention mechanism. In other words, if the single retainer system fails, the coupling will disengage. Moreover, although it is known to provide a separate retainer to be snapped over a spring lock coupling of the type disclosed in the '359 patent, the present invention provides not only a retainer but also the capability of disengaging the primary fastening means. In this manner, the requirement for a disconnection tool of the type shown in the '359 patent will be obviated. This is advantageous because field service technicians having the benefit of the present invention will not be required to maintain a supply of various sized disconnection tools to permit the servicing of machinery equipped with couplings including the present combination retainer and disassembly tool. It is accordingly an object of the present invention to provide a tube coupling having a combination retainer and disassembly tool which will provide a retention feature as well as the capability to separate the coupling without the addition of any special tools.

It is yet another object of the present invention to provide a coupling which is easily serviceable in the field.

It is an advantage of the present invention that a coupling and retainer according to this invention will require less package volume than known systems having special tools for disconnecting the coupling's primary fastening means.

It is yet another advantage of the present invention that a coupling and retainer according to this invention may be quickly connected *and* disconnected without any additional tools or fixtures.

Other objects, features and advantages of the present invention will become apparent to the reader of this specification.

SUMMARY OF THE INVENTION

A tube coupling and combination retainer and disassembly tool includes a first tube having a first end portion comprising means for telescopically receiving a second tube therein and a second tube having a second end portion comprising means for telescopically engaging the first end portion. The coupling further includes first fastening means for securing the first and second end portions to each other. A tube coupling and retainer according to this invention further comprises second fastening means for selectively securing the first and second end portions to each other and for disengaging the first fastening means. As used in this case, "selectively" means that the second fastening means is used not only for providing a redundant structure for securing the first and second tubes to each other, but also functions as a tool for disengaging the first, or primary, fastening means built into the tube coupling. The first fastening means may comprise a caged circular spring for engaging a mating structure comprising part of the first end portion. The second fastening means may comprise a clip having a mounting segment for maintaining the clip in engagement with the first end portion, a retention segment radially engageable with the second end portion to maintain the engagement of the first and second end portions, and a release segment which is axially engageable with the first fastening means to disengage the first and second end portions.

According to one aspect of the present invention, the mounting segment of the combination retainer and disassembly tool comprises a generally U-shaped structure having a pair of legs for gripping the first end portion of the first tube, while allowing the clip to move axially with respect to the first and second end portions. The legs comprising part of the U-shaped structure allow the mounting segment to be positioned in either of two radial positions. The first radial position is one in which the retention segment has sufficient radial clearance from the second end portion to allow the clip to be moved axially to a position in which the retention segment is poised above and engageable with the second end, whereas the second radial position corresponds to the installed position of the retention segment in which the retention segment captures the first and second ends to present disengagement of the coupling. The retention segment of the combination clip preferably comprises a plurality of U-shaped axially and radially extending members which are attached to the base U-shaped structure. Finally, the release segment comprises a plurality of axially extending members attached to the mounting segment, either directly or to the retention segment, with the release segment members extending axially so that they will engage the first fastening means when separation of the coupling is desired.

The primary fastening means of a coupling according to the present invention may comprise a caged circular spring for engaging a mating structure comprising part of the first end portion, or some other type of spring means for securing the first and second end portions to each other. In any event, the secondary fastening means for selectively securing the first and second end portions to each other and for disengaging the spring means will include a release segment for disengaging the spring means or other type of first fastening means.

DETAILED DESCRIPTION OF THE PREFERRED EMBODIMENTS

Figure 3:
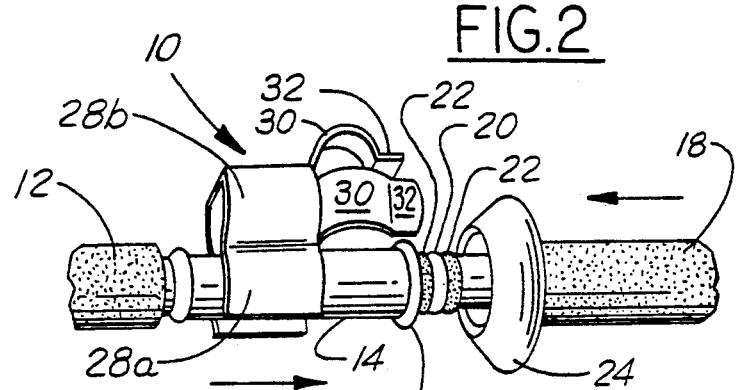
FIG. 3 is a perspective view of a tube coupling and combination retainer and disassembly tool according to the present invention showing the first and second tube end portions in a partially engaged position.

As shown in the various Figures, and with particularity in FIGS. 3-5 and 7-11, a tube coupling and combination retainer and disassembly tool according to the present invention is intended to couple first and second tubes 12 and 18, respectively. Turning to FIG. 3, tube 12 has a first end portion 14 having a flared end 16 which engages a first fastening means comprising part of the second end portion of tube 18. Note that the inside diameter of first end portion 14 is larger than the outside diameter of spigot 20 which comprises a portion of the second end portion of tube 18. In this manner, spigot 20 can be received telescopically within large tube portion 14. A leakproof seal is assured by the use of two O-rings, 22, which are inlet into spigot 20.

Figure 7:
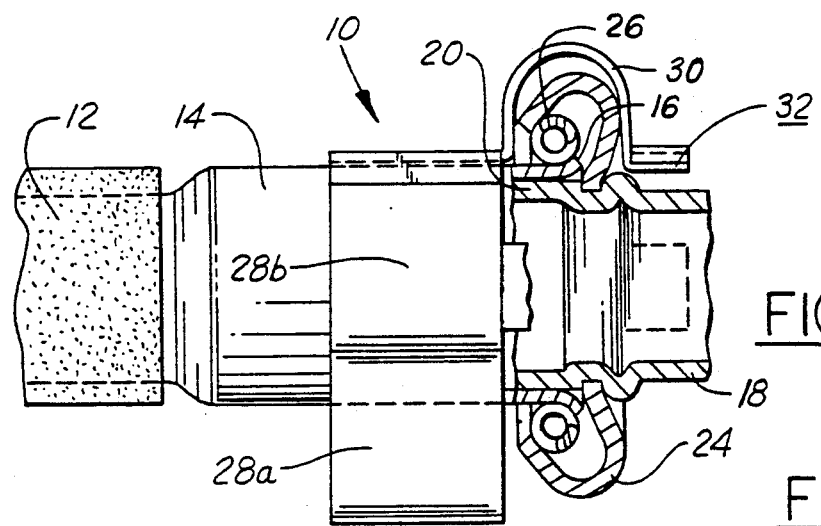
FIG. 7 is a partial section of a coupling device according to the Present invention shown in the fully locked position.
Figure 10:
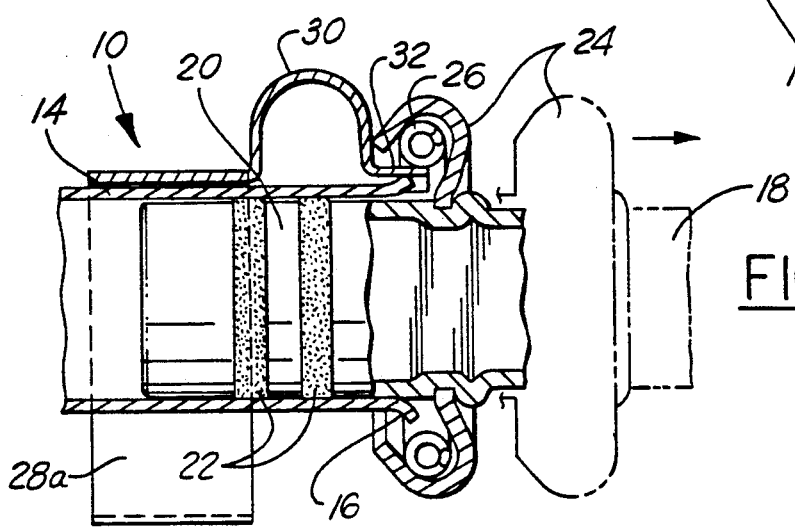
FIG. 10 is a partially broken away view corresponding to FIG. 9, which shows the operation of a combination retainer and disassembly tool to release a retaining spring according to one aspect of the present invention.

A first fastening means according to an aspect of the present invention comprises circular spring 26, which is shown in FIGS. 7 and 10. When first end portion 14 and second end portion 18, specifically comprising spigot 20, are brought together telescopically, spring 26 is first displaced radially by flare 16, and as the coupling is further brought together, spring 26 rides over flare 16 and snaps down so that the spring is tightly bound about first end portion 14. This condition is shown in FIG. 7. Moreover, spring 26 is captured within cage 24 so that the mating parts of the coupling cannot be separated. The present invention is directed to the situation wherein it is desirable to have a redundant fastening means for selectively securing first and second end portions to each other, and also for disengaging the first or primary fastening means, which in the illustrated embodiment in FIGS. 7 and 10 comprises spring 26 and cage 24. Those skilled in the art will appreciate in view of this disclosure that other types of first fastening means other than the illustrated circular caged spring and mating flare could be used in a tube coupling and combination retainer and disassembly unit according to the present invention.

It may happen during the assembly of a machine having a push lock coupling, either of the illustrated variety or some other variety, that the production operator responsible for locking the coupling may not actually bring the first and second end portions of the coupling together either with sufficient force or with the proper dimensional relationship to cause the coupling to be in the fully locked position. In this case, clip 10, which is shown in the various figures, is of particular utility. The clip comprises a mounting segment for maintaining the clip in engagement with the first end portion 14 of tube 12, a retention segment which is radially engageable with the second end portion of tube 18, in this case, cage 24, so as to maintain the engagement of the first and second end portions, and a release segment which is axially engageable with spring 26 in this case, so as to disengage the first and second end portions.

Figure 1:
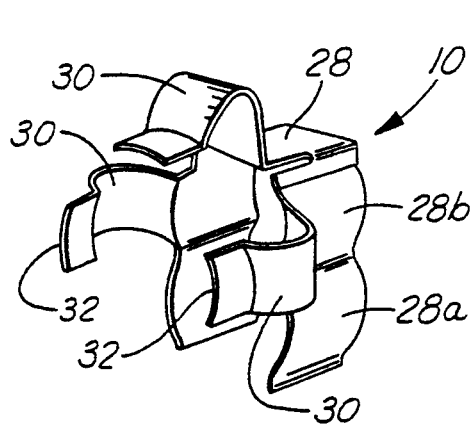
FIGS. 1 and 2 are perspective views of a combination retainer and disassembly tool according to one aspect of the present invention.
Figure 2:
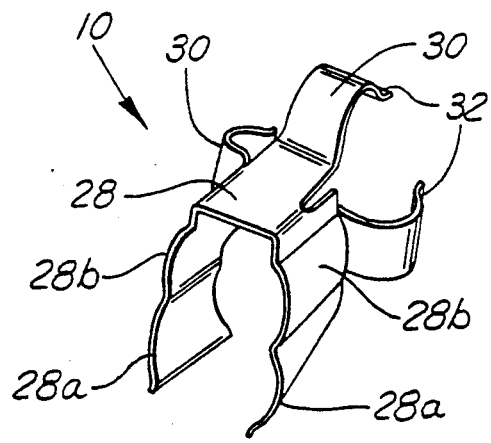

The combination retainer and disassembly clip according to an aspect of the present invention is shown with particularity in the Figures. In FIGS. 1 and 2, it can easily be seen that the mounting segment of the clip comprises a U-shaped structure, 28, having a pair of legs for gripping first end portion 14 in either of two radial positions. In either of the radial positions, U-shaped structure 28 allows the clip to slide axially if certain conditions are met.

Figure 4:
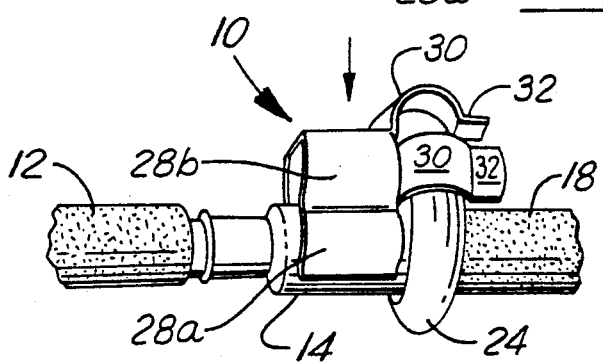
FIG. 4 is a perspective view of the device of the present invention showing the first fastening means, in this case a caged garter spring and mating flare, being in the fully engaged position whereas the second fastening means is in its first position in which the retention segment of the second fastening means has sufficient radial clearance from the second end portion, e.g., the caged garter spring, to move axially over the first fastening means.

The first radial position of the clip is shown in FIGS. 3 and 4. In FIG. 3, the clip is mounted on cylindrical first end portion 14 by means of leg portions 28a, which, as shown in FIGS. 1 and 2, are generally arcuate in shape and which allow the clip to be positioned radially as shown in FIGS. 3 and 4. While in this first position, the clip is free to slide axially along first end portion 14. FIG. 3 shows the position the clip will have before assembly of the joint. Notice that the clip is positioned away from flare 16 and in the direction of tube 12. After spigot 20 has been engaged with first end portion 14, the joint looks as shown in FIG. 4. Note that clip 10 remains in the first radial position. The first position allows the retention segment, in this case U-shaped retention members 30, which are attached to portions 28b as well as to the bight of the U-shaped mounting member, to move past cage 24 and to thereby allow the first and second end portions of the coupling to be brought together telescopically to the position shown in FIG. 4.

After the first and second tube end portions have been brought together telescopically to the locked position such that circular spring 26 has ridden over flare 16 as shown in FIG. 7, the clip may be moved to the second radial position illustrated in FIGS. 5-10. Note here that the second radial position of the clip corresponds not only to its deployment as a means for securing the first and second end portions to each other, shown with particularity in FIGS. 5-7; the second radial position also refers to the position of the clip during its use as a tool for disengaging the spring means 26, as shown in FIGS. 8-11.

Figure 5:
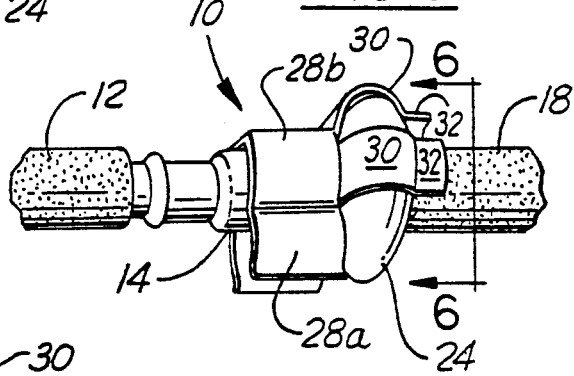
FIG. 5 is a perspective view similar to FIG. 4 in which the second fastening means or clip has been moved radially into complete engagement with the first fastening means.
Figure 6:
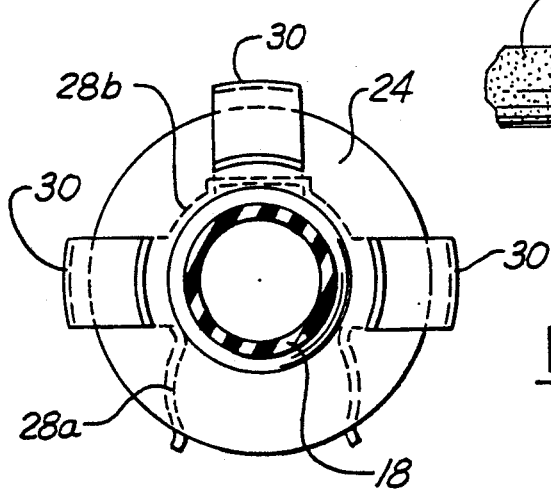
FIG. 6 is an end view of a coupling device according to the present invention taken along the line 6—6 of FIG. 5.

FIGS. 5-7 show retainer and disassembly tool 10 in the fully locked position. While in this position, U-shaped retention members 30, which are integral with U-shaped structure 28, partially encircle cage 24, and thereby prevent separation of the tube coupling. Accordingly, even should a production operator not engage the spring portion of a tube coupling sufficient to prevent subsequent separation of the coupling, the combination retainer and disassembly tool provides a secure and visually observable indication that the tube coupling is nevertheless soundly made.

Operation of the combination retainer and disassembly tool to separate the spring means which secures the first and second end portions employs axially extending release members 32 which are integral with U-shaped retention members 30. As best seen in FIGS. 1 and 6, release members 32 are arcuate in shape and generally follow the outside diametral curvature of first end portion 14.

The steps involved in deployment of the combination retainer and disassembly tool to separate a joint according to the present invention are shown in FIGS. 4 and 8-11. Beginning with FIG. 4, clip 10 is first moved to the first radial position in which retention members 30 are sufficiently separated from the cage 24 to allow the clip to be pulled back to the axial position shown in FIG. 8. Thereafter, the clip is moved to the axial and radial position shown in FIG. 8. In other words, the clip is moved to the second radial position.

Figure 9:
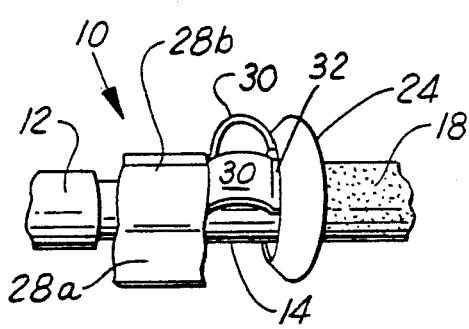
FIG. 9 illustrates the axially inserted position of the combination tool to release a spring lock coupling according to the present invention.
Figure 8:
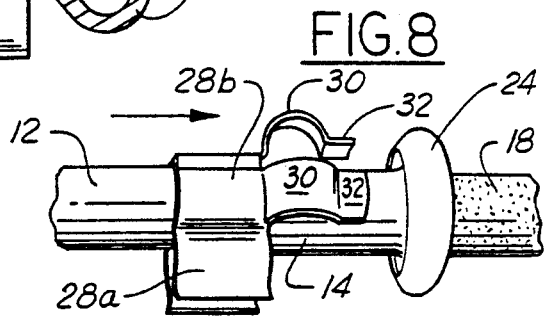
FIG. 8 illustrates a first step in the use of a combination retainer and disassembly tool to separate the first, or primary, fastening means.
Figure 11:
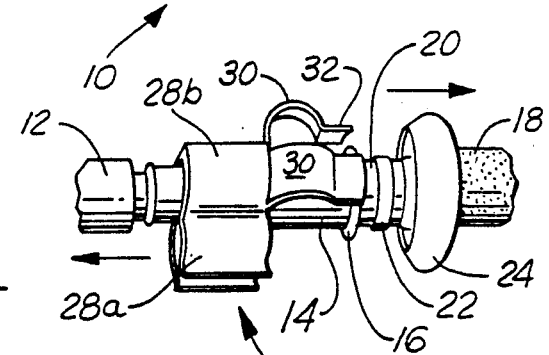
FIG. 11 illustrates a coupling according to the present invention which has been axially separated after a combination retainer and disassembly tool has released a first fastening means.

FIG. 9 illustrates the axially inserted position of clip 10, in which the clip has full contact with spring 26. FIG. 10 shows the completed axial insertion in which release members 32 are fully interposed between spring 26 and flare 16, thereby allowing first end portion 14 to be withdrawn from contact with spring 26. The separated end portions are shown in FIG. 11. Note that FIG. 11 is very similar to FIG. 3, the difference being that the clip 10 is in the first radial position in FIG. 3 in which it can slide over cage 24, while being in the second radial position in FIG. 11. FIG. 10 illustrates in dotted lines the axial movement of one end portion with respect to the other, which is Permitted by the intervention of release members 32 with spring 26. It will be realized that once the coupling has been separated and clip 10 repositioned as shown in FIG. 3, a joint according to the present invention may be remade manually without the aid of any additional tools or components. It will be further appreciated that a tube coupling and combination retainer disassembly tool according to this invention may be made in any rotational orientation. As a result, tubes, hoses or lines joined with this coupling will not be subjected to torques transmitted by the coupling, and can be installed with ease by an operator.

It is to be understood that this invention is not limited to the exact construction illustrated and described above, but that various changes and modifications may be made without departing from the spirit and scope of the invention as defined by the following claims.

We claim:

1. A tube coupling and combination retainer and disassembly tool, comprising:
    a first tube having a first end portion comprising means for telescopically receiving a second tube therein;
    a second tube having a second end portion comprising
    means for telescopically engaging said first end portion and
    first fastening means for securing said first and second end portions to each other; and
    second fastening means for selectively securing said first and second end portions to each other and for disengaging said first fastening means.

2. A tube coupling and combination retainer and disassembly tool according to claim 1, wherein said first fastening means comprises a caged circular spring for engaging a mating structure comprising part of said first end portion.

3. A tube coupling and combination retainer and disassembly tool according to claim 1, wherein said second fastening means comprises a clip having:
    a mounting segment for maintaining said clip in engagement with said first end portion;
    a retention segment, radially engageable with said second end portion, to maintain the engagement of said first and second end portions; and
    a release segment, axially engageable with said first fastening means, to disengage said first and second end portions.

4. A tube coupling and combination retainer and disassembly tool according to claim 3, wherein said clip comprises a unitary structure.

5. A tube coupling and combination retainer and disassembly tool according to claim 3, wherein said mounting segment comprises a generally U-shaped structure having a pair of legs for gripping said first end portion while allowing said clip to move axially with respect to said first and second end portions, wherein said radial positions comprise a first position in which said retention segment has sufficient radial clearance from said second end portion to allow said clip to be moved axially to a position in which the retention segment is poised above and engageable with said second end, and a second radial position corresponding to the installed position of the retention segment.

6. A tube coupling and combination retainer and disassembly tool according to claim 3, wherein said mounting segment comprises a generally U-shaped structure having a pair of legs for gripping said first end portion in either of two radial positions, while allowing said clip to move axially with respect to said first and second end portions.

7. A tube coupling and combination retainer and disassembly tool according to claim 3, wherein said mounting segment comprises a generally U-shaped structure for keeping said clip secured to said first and second end portions, and said retention segment comprises a plurality of U-shaped axially and radially extending members attached to said generally U-shaped structure, for engaging said second end portion.

8. A tube coupling and combination retainer and disassembly tool according to claim 7, wherein said release segment comprises an axially extending member attached to each of said retention segment members, for engaging said first fastening means.

9. A tube coupling and combination retainer and disassembly tool according to claim 3, wherein said mounting segment comprises a structure for keeping said clip secured to said first and second end portions, and said release segment comprises a plurality of axially extending members attached to said mounting segment, for engaging said first fastening means.

10. A tube coupling and combination retainer and disassembly tool, comprising:
- a first tube having a first end portion comprising means for telescopically receiving a tube having a second end portion therein;
- a second tube having a second end portion comprising:
- means for telescopically engaging said first end portion; and
- spring means for securing said first and second end portions to each other; and
- secondary fastening means for selectively securing said first and second end portions to each other and for disengaging said spring means, with said secondary fastening means comprising a clip having:
- a mounting segment for maintaining said clip in engagement with said first end portion;
- a retention segment for maintaining the engagement of said first and second end portions; and
- a release segment for disengaging said spring means.

11. A tube coupling and combination retainer and disassembly tool according to claim 10, wherein said retention segment is radially engageable with said first and second end portions and said release segment is axially engageable with said spring means.

12. A tube coupling and combination retainer and disassembly tool, comprising:
- a first tube having a first end portion;
- a second tube having a second end portion telescopically received within said first end portion;
- primary fastening means for securing said first and second end portions to each other; and
- secondary fastening means for selectively securing said first and second end portions to each other and for disengaging said primary fastening means.

13. A tube coupling and combination retainer and disassembly tool according to claim 12, wherein said secondary fastening means comprises a clip having:
- a mounting segment for maintaining said clip in engagement with said first end portion;
- a retention segment for maintaining the engagement of said first and second end portions; and
- a release segment for disengaging said primary fastening means.

* * * * *